United States Patent
Ando et al.

(10) Patent No.: US 6,741,009 B1
(45) Date of Patent: May 25, 2004

(54) ARMATURE OF ROTATING ELECTRICAL MACHINE AND WIRE WINDING METHOD THEREOF

(75) Inventors: Susumu Ando, Shuuchi-gun (JP); Hayato Ariyoshi, Shuuchi-gun (JP)

(73) Assignee: Kabushiki Kaisha Moric, Mori-Machi (JP)

( * ) Notice: Subject to any disclaimer, the term of this patent is extended or adjusted under 35 U.S.C. 154(b) by 0 days.

(21) Appl. No.: 10/604,808

(22) Filed: Aug. 19, 2003

(30) Foreign Application Priority Data

Sep. 6, 2002 (JP) ......................................... 2002-260949

(51) Int. Cl.[7] .................................................. H02K 1/12
(52) U.S. Cl. ........................ 310/254; 310/215; 310/260; 310/216
(58) Field of Search ................................. 310/215–218, 310/254, 258, 259, 260, 270, 179, 195; 29/596, 602.1, 605, 606, 607, 609

(56) References Cited

U.S. PATENT DOCUMENTS

| | | | | |
|---|---|---|---|---|
| 2,970,237 A | * | 1/1961 | Kent .......................... | 310/260 |
| 5,304,885 A | * | 4/1994 | Wong et al. ................. | 310/216 |
| 6,072,259 A | * | 6/2000 | Kawabata et al. .......... | 310/216 |
| 6,127,760 A | * | 10/2000 | Nagasaki et al. ........... | 310/254 |
| 6,590,310 B2 | * | 7/2003 | Takano ........................ | 310/254 |
| 6,633,102 B2 | * | 10/2003 | Nagai et al. ................. | 310/215 |

* cited by examiner

*Primary Examiner*—Dang Le
(74) *Attorney, Agent, or Firm*—Ernest A. Beutler

(57) ABSTRACT

An armature and method of winding the armature that improves coil density by winding adjacent poles so that the resulting windings have outer surfaces that taper in opposite directions that extend over a bisecting axially extending plane between the pole teeth at opposite ends thereof. The poles having the greatest radial extent relative to the pole axis at their base ends that are wound first.

14 Claims, 4 Drawing Sheets

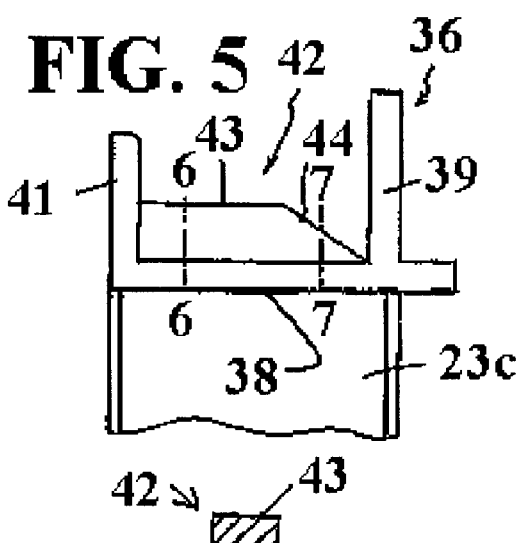
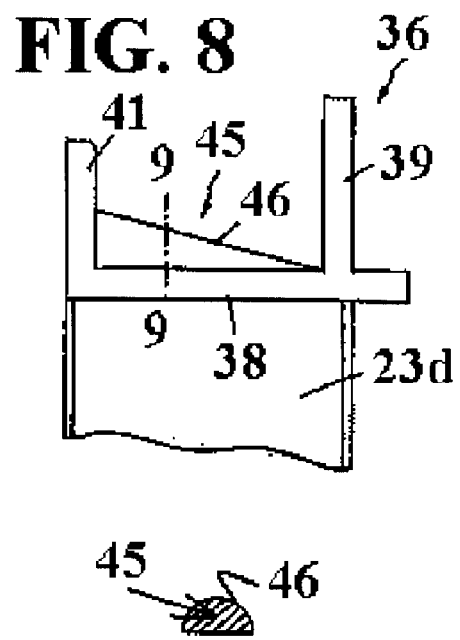
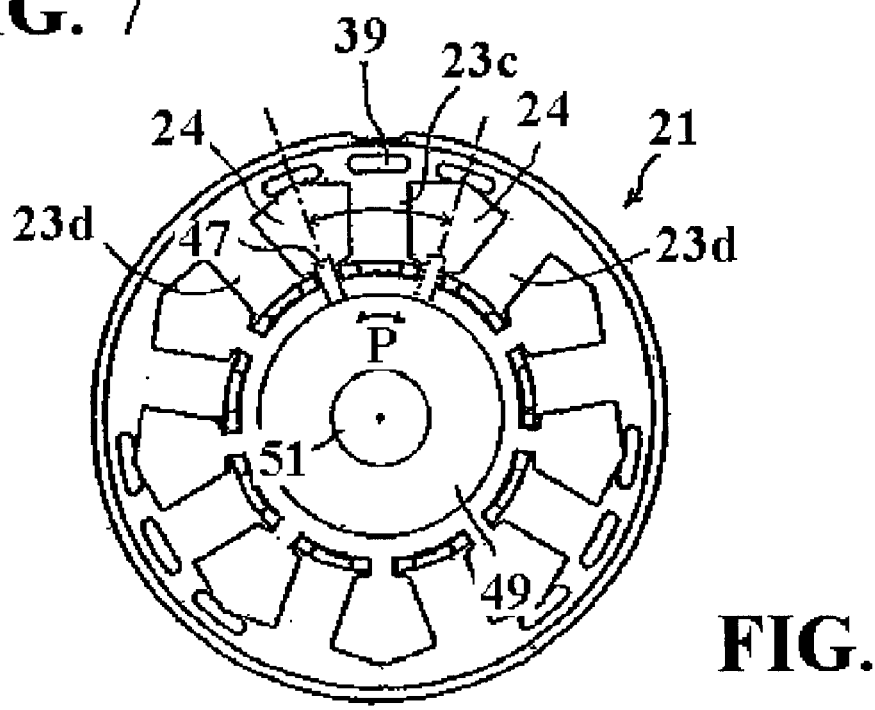

ARMATURE OF ROTATING ELECTRICAL MACHINE AND WIRE WINDING METHOD THEREOF

BACKGROUND OF INVENTION

This invention relates to the armature of a rotating electrical machine and more particularly to the coil winding thereof and the method of forming such winding.

The armature of a rotating electrical machine is generally comprised of a core consisting of a circular core portion from which a plurality of circumferentially spaced teeth radially extend. Coils are wound around these teeth and cooperate with circumferentially spaced permanent magnets. Such constructions are employed in both electric motors and generators.

Generally the coils are wound around the pole teeth by feeding a wire in looping fashion around the pole teeth. The wire is fed from a feeding needle that is extended into the space between the adjacent teeth and the needle is passed in a circular fashion around the pole tooth and the wire is deposited thereon in coils. As the winding continues the needle is gradually moved along the length of the tooth so that it is fully wound.

The resulting structure is shown in FIG. 1 which is a partial view of an armature being wound in the conventional prior are method. The armature is indicated generally by the reference numeral 21 and has a ferromagnetic core consisting of a circular ring portion 22 from which pole teeth 23 radially extend. The core is preferably formed from a plurality of laminated sheets. The pole teeth 23 are circumferentially spaced to define gaps 24 therebetween. The ends of these pole teeth are formed with projections 25 to define a narrow mouth 26 opening into the gap 24.

A winding needle 27 is passed into the gap 24 through the mouths 26 and feeds a wire 28 around an insulating bobbin (not shown) that encircles each pole tooth 23. As the needle 27 is passed around the pole teeth in a circular pattern the wire is looped onto the pole teeth 23 to form the coils, indicated generally at 29.

Thus it is clear that the number of turns around each pole tooth 23 is limited due to the necessity of providing clearance for the needle. To overcome this disadvantage and to permit greater winding density, inventors of the assignee hereof have proposed a construction as disclosed in U.S. Pat. No. 6,590,310, issued Jul. 8, 2003, entitled "STATOR COIL STRUCTURE FOR REVOLVING-FIELD ELECTRICAL MACHINE AND METHOD OF MANUFACTURING SAME". Certain inventors hereof have also invented several improvements thereon presently pending.

These inventions either eliminate totally or minimize the projection of the winding needle into the slot during winding. This is accomplished by providing an insulating projection on one or both radially extending, axially spaced faces of the pole teeth. The wire end is restrained at an end of the pole tooth and as the winding occurs the wire is caused to slide along the pole tooth until it is stopped by contact with the ring portion of the armature of the previous coil winding. In this way the coils pile up and it is possible for the windings on one pole tooth to fill nearly all of area on one side of the gap between adjacent pole teeth. The remainder of the gap is nearly filled by the winding around the adjacent pole tooth.

Although these inventions greatly improve the winding density, there can be further improvement. For example, with those inventions there is a possibility of interference between adjacent windings in the area of the slot causing the possibility of damage to the insulation of the winding and/or the winding may bulge out of the mouth of the slot. Thus some clearance is provided.

It is, therefore, a principle object of this invention to provide an armature construction and winding method that permits greater coil density.

SUMMARY OF INVENTION

A first feature of the invention is adapted to be embodied in an electrical armature comprised of a core having a plurality of pole teeth extending radially from a circular ring portion. A plurality of winding coils each encircle a respective one of the pole teeth. The coil windings on adjacent of the pole teeth are wound such that the radial extent of the windings relative to an axis of the respective pole tooth is not the same at all positions along the length of the pole tooth axis. The radially outermost winding of at least one of the adjacent pole teeth extends across an axially extending plane positioned equidistant between the adjacent pole teeth.

Another feature of the invention is adapted to be embodied in a method of winding an electrical armature. The armature is comprised of a core having a plurality of pole teeth extending radially from a circular ring portion. The method comprises winding an electric wire around a first of said pole teeth to form a plurality of winding coils the radial extent of which relative to an axis of the respective pole tooth is not the same at all positions along the length of the wound pole tooth axis so that the radially outermost winding extends across an axially extending plane positioned equidistant between adjacent pole teeth.

BRIEF DESCRIPTION OF DRAWINGS

FIG. 5 is a cross sectional view taken along the line 5—5 of FIG. 4 but with the windings removed.

FIG. 6 is a cross sectional view taken along the line 6—6 of FIG. 5.

FIG. 7 is a cross sectional view taken along the line 7—7 of FIG. 5.

FIG. 8 is a cross sectional view taken along the line 8—8 of FIG. 4 but with the windings removed.

FIG. 9 is a cross sectional view taken along the line 9—9 of FIG. 8.

FIG. 10 is a side elevational view of the entire armature during the winding operation.

DETAILED DESCRIPTION

Figure 1:
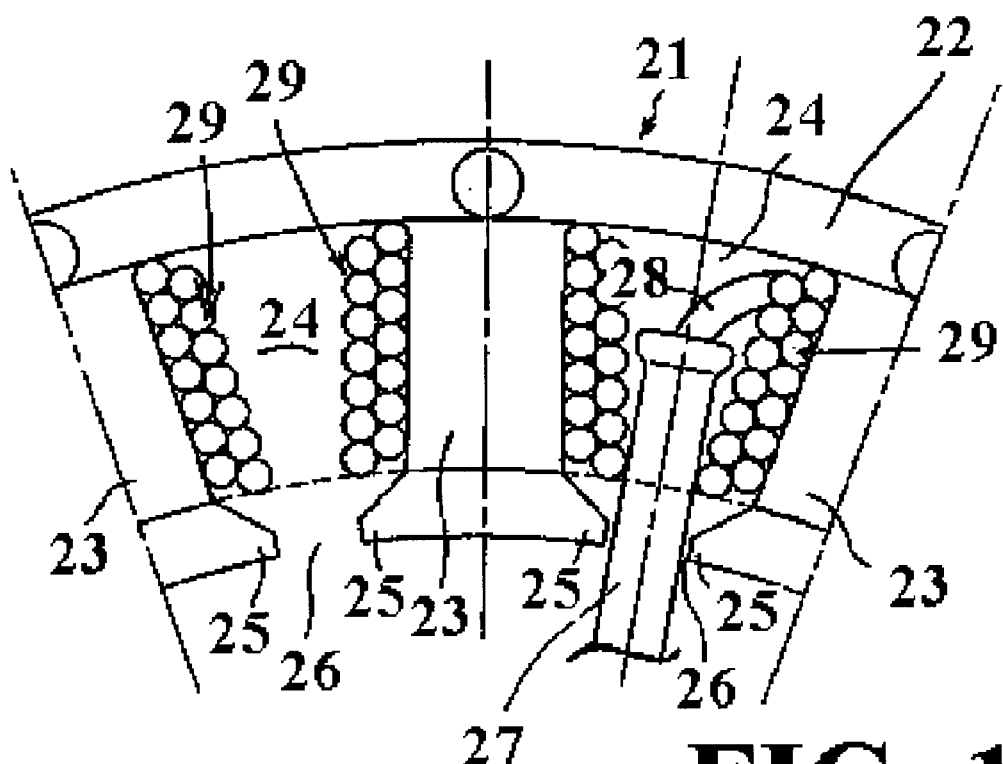
FIG. 1 is a partial cross sectional view of an armature having a construction of a prior art type and wound in accordance with a prior art method.

Referring now in detail to the remaining figures of the drawings the basic construction of the armature core is the same as the prior art, where components are the same they will be identified by the same reference numerals and will be described again only where necessary to understand the invention. As noted above, the construction disclosed in U.S. Pat. No. 6,590,310 is effective in increasing the winding density. However it, like the prior art generally has like windings on each of the pole teeth and thus presents gaps in the winding even though it attempts to provide substantial winding coverage. That is each tooth has the same number of turns on it and thus there will exist some clearance on both sides of a plane that extends axially through the center of the gap between adjacent teeth.

Figure 2:
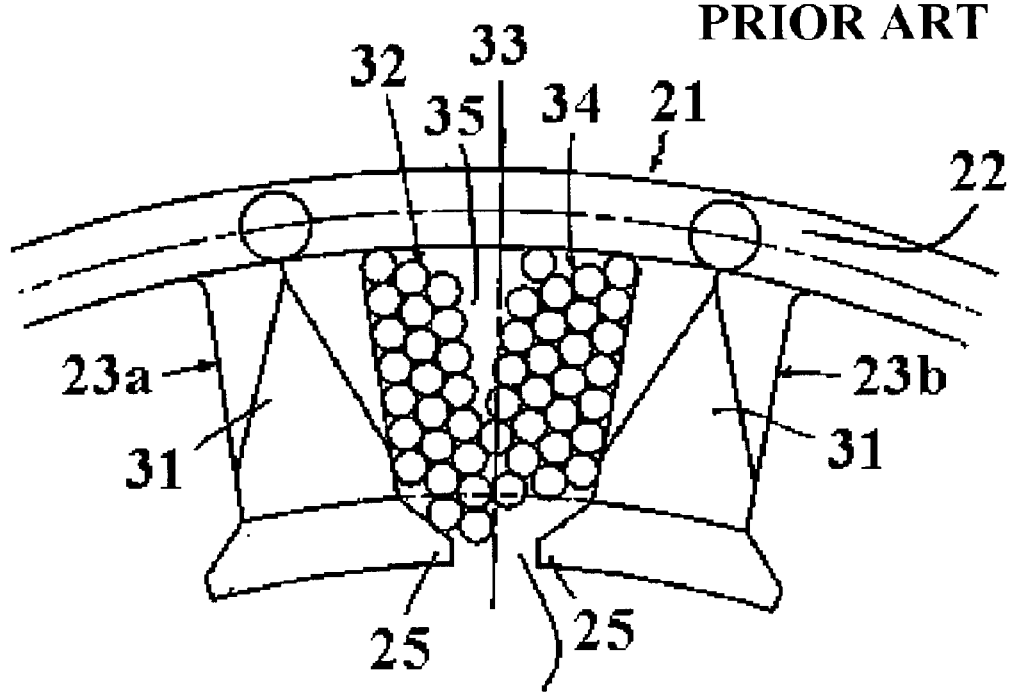
FIG. 2 is a partial cross sectional view, in part similar to FIG. 1, but showing a first concept of the invention.

Therefore the inventors hereof have conceived that the winding density could be improved if adjacent teeth were wound differently as shown in FIG. 2. This figure shows the use of the method of the aforenoted patent and the insulators formed on at least one axial face of the pole teeth 23 are indicated generally by the reference numeral 31. These insulators 31 can have any of the shapes disclosed in the aforenoted patent. As seen in FIG. 2, the left side pole tooth of the pair, designated 23a has an equal number of windings 32 along its length and these windings (3 in number) all lie on one side of the bisecting axial plane 33. On the other hand the remaining pole tooth of the adjacent pair, designated as 23b also has an equal number of windings 34 along its length (4) and thus some of these windings lie on the same side of the plane 33 as the windings 32. This increases the winding density, but still leaves a gap 35.

Figure 12:
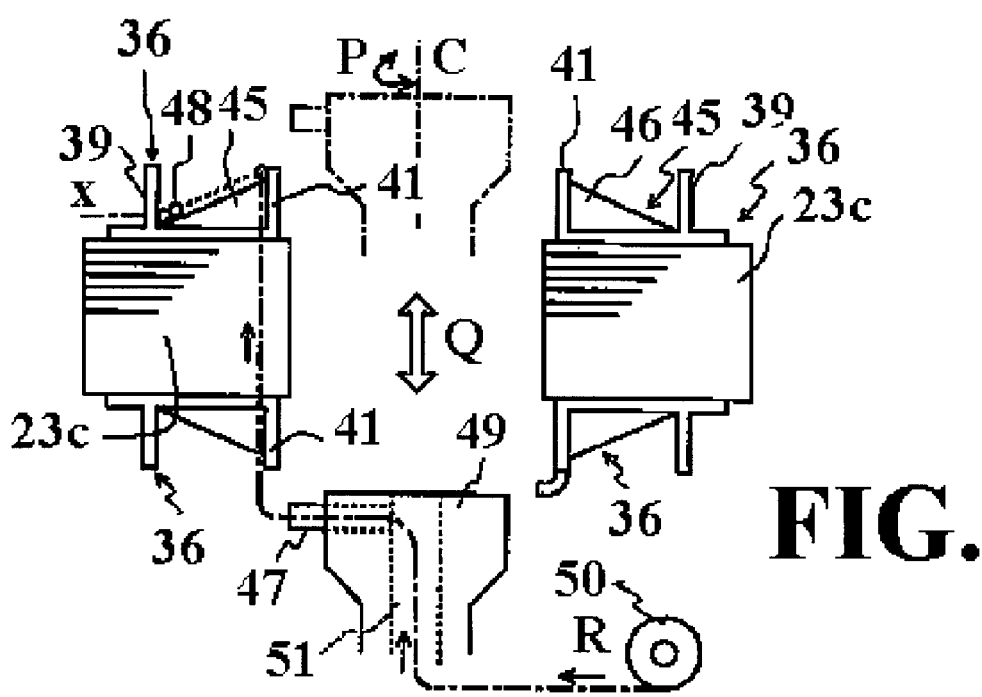
FIG. 12 is a view taken perpendicular to FIG. 11 and shows the path of the winding needle.

Therefore and as shown in the remaining figures, another winding configuration and method is employed to still further improve the winding density. As seen in FIGS. 5, 8 and 12 the pole teeth 23 are divided into two groups 23c and 23d in alternating fashion. Thus adjacent pairs of the pole teeth 23 consist of one pole tooth from each group (23c and 23d). These figures also show the insulating bobbins, indicated generally as 36. The bobbin 36 may, as in the prior art be formed from two mating halves. They consist of annular ring portions 37 from which pole tooth encircling portions 38 extend in embracing fashion to the pole teeth 23.

Projections 39 extend axially outwardly from the ring portion at the base of each pole tooth 23. In a similar manner, projections 41 are formed on the axial outer sides of the bobbin 36 at the radial outer tip of the pole teeth. The construction of the bobbin as thus far described is the same for the pole teeth 23c and 23d. However insulators are provided in the axial outer sides of the bobbin tooth encircling portions 38 and these insulators as will next be apparent have a different configuration.

The insulators associated with the pole teeth 23c are indicated generally by the reference numeral 42 and their configuration is best shown in FIGS. 5–7. These insulators 42 have a generally rectangular cross section portion 43 that extends from the tip of the teeth 23c nearly to their roots. Then the insulators are formed with a steeply tapered portion 44 that has a curves cross section, as shown in FIG. 7. The reason for this shape will be described shortly.

The shape of the insulators associated with the pole teeth 23d is shown in FIGS. 8 and 9 and they are indicated generally by the reference numeral 45. These insulators have a slight inclination for their full length as indicated at 46 that has a curved cross section as seen in FIG. 9.

The winding method will now be described by reference to FIGS. 3, 4 11 and 12. This comprises the winding of the pole teeth 23c before the pole teeth 23d. The path of the winding needle, indicated by the reference numeral 47, is the same for each pole tooth 23. However the shape of the winding on the pole teeth 23c is different from that on the pole teeth 23d.

When winding the pole teeth 23c, the needle 47, which has a tubular configuration feeds a coil wire 48. The needle 47 is carried by a head 49. The coil wire 48 is unwound and fed out of a coil wire roll 49, passed through a passage hole 51 in the head 49, and drawn out of the tip of the needle 47 (as shown with an arrow R) as the coil winding operation continues. Initially the end of the coil wire 48 is secured with a clamp (not shown) at a supporting position indicated with a symbol x in FIG. 12 provided at the root of the magnetic pole tooth upon which the coil is being wound.

The head 49 reciprocates as indicated with an arrow Q in the direction of its axis C inside the circumference of the armature 21. Depending upon the axial length of the armature 21, the needle 47 reciprocates between a bottom position (indicated in solid lines in FIG. 12) that is below the projection 39 of the lower bobbin portion and a top position (indicated in broken lines in FIG. 12) that is above the projection 39 of the upper bobbin portion. The head 49 also rotates about its axis C as indicated with an arrow P in FIGS. 10 and 12 and moves laterally as indicated by an arrow W in FIG. 10 by the width of the magnetic pole tooth 23 when the needle 47 is in both the top and bottom positions vertically outside of the armature 21 and specifically outside the mouth 26 of the slot 24.

Figure 11:
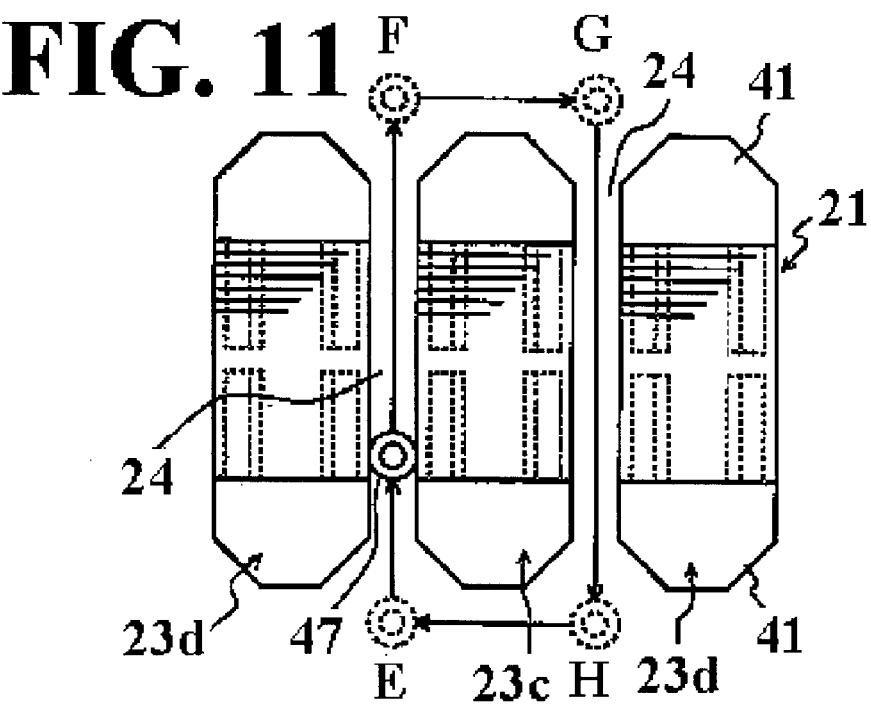
FIG. 11 is a partially developed view of the armature showing the path of the winding needle.

During the coil winding operation, the needle 47 does not move in any significant amount into the slot 24. The tip of the needle 47 is maintained in the area of the slot opening 26. The coil winding operation is performed, as shown in FIGS. 11 and 12 with the needle 47 moving around each magnetic pole tooth 23c. In other words, the tip of the needle 47 moves along a rectangular locus made up of vertical and lateral strokes in the sequence of E, F, G, H, and back to E, to make one turn of the coil. The coil wire 44, with its end secured at the place x, slips off over the tapered portion 44 to be wound in order from the bottom or root side of the magnetic pole tooth 23c during the looping movement.

In other words, the coil wire 48 is wound at a constant position on the tapered portion 44when the winding starts (the higher side). Since the end of the coil wire 48 is clamped outside the lower side of the tapered portion 44, the coil wire 48 is drawn out successively as the winding operation of the needle 47 goes on, and wound around the tapered portion 44 of the magnetic pole tooth. Since the wire wound on the tapered portion 44 receives a tensile force between the outer side (lower side) and the inner side (higher side) of the tapered surface, the wire slips off along the slope surface due to the component of the tensile force along the tapered surface and the pressing force of the wire subsequently wound. In this way, the coil wire 48 is pushed out sequentially on the tapered surface 44 to form the first layer of the coil.

Figure 3:
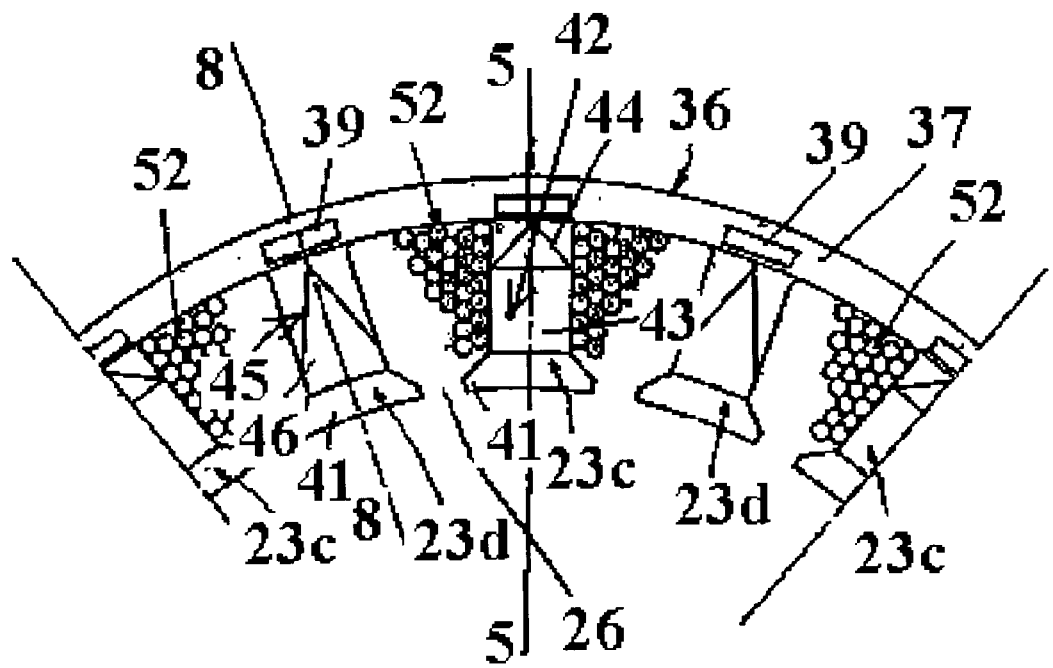
FIG. 3 is a partial cross sectional view, in part similar to FIGS. 1 and 2, but showing the first step of a winding method embodying the invention.
Figure 4:
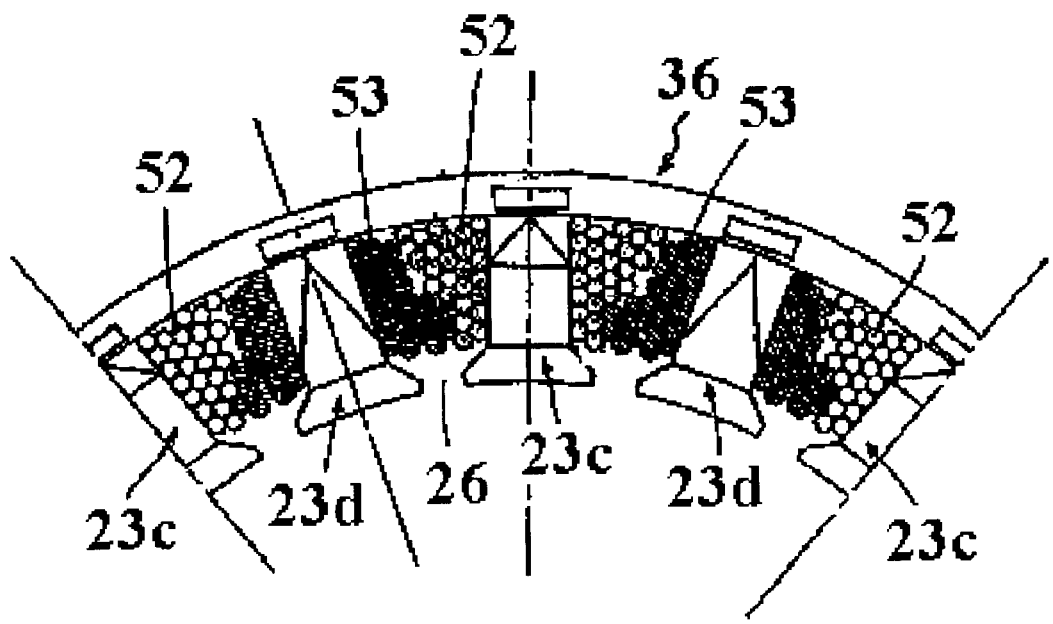
FIG. 4 is a partial cross sectional view, in part similar to FIG. 3, showing the first step of the winding method embodying the invention.

The second layer is wound, again starting from the root side by returning the coil wire 48 to the root side and holding it at an appropriate position. The remainder of the coils are then wound to result in the structure as shown in FIG. 3 Although the drawing shows only one needle, this is merely to simplify the illustration. Preferably a plural number of needles 47 are used to wind plural coils simultaneously at different circumferential positions. For example, three needles may be provided at 120 degree intervals radially to wind coils around three magnetic pole teeth 23c at the same time.

As a coil winding method without inserting the needle into the slot, a lasso method may be used together with or separately from the slip off method. According to such a lasso method, the coil wire 48 is drawn out of the needle tip 47 such that the length of one loop of the locus of the needle tip is longer than that of one turn of the coil so that a slack is provided. The draw-out support point x of the coil wire 48 is fixed to the outer side of the bottom of the slot 35 and the coil wire 48 having the slack is wound at a speed, so that the coil wire 48 is moved toward the draw-out support point x by lasso effect. In this way the coil is wound around the magnetic pole tooth 23c.

In such a "lasso" method, the needle 47 is moved so that the amount of slack decreases on each succeeding turn either continuously or in steps so the coil is wound around the magnetic pole tooth along its length. The slack may be provided to the coil wire 48 in several ways include (1) increasing the vertical movement in the stroke of the needle 47, (2) increasing the lateral (rotary) movement in the stroke of the needle 47, (3) moving the needle 47 back and forth when the needle is in a position outside the opening of the slot (indicated with E, F, G, or H in the drawing), or combinations of these methods.

Because the tapered portion 44 is formed mainly at the base or root portions of the pole teeth 23c, a greater number of windings will be formed in this area as clearly seen in FIG. 3 The number of windings decreases toward the tip end of the pole teeth 23c, these windings are identified by the reference number 52. At the base of the pole teeth 23c, the winding 52 extend substantially over the bisecting axial plane toward the adjacent pole teeth 23d on opposite sides of the wound pole teeth 23c. In essence the outer surface of the winding 52 tapers from its widest point at the base or root of the pole teeth 23c to their inner or tip end extremities.

After the pole teeth 23c have all been wound, then the remaining pole teeth 23d are wound in the same manner. However, because of the more gradual taper of the insulators 45 the number of windings at the base or root of the teeth 23d and the existence of the windings 52 will be less and will progressively increase toward the inner or tip end thereof as clearly seen in FIG. 4. As also seen in this figure the windings on the pole teeth 23d, indicated by the reference numeral 53 will extend over the bisecting axial plane between the pole teeth. Thus the winding density is substantially increased over the prior art.

Of course those skilled in the art will readily understand that the described embodiments are preferred embodiments of the invention and various changes and modifications may be made within the spirit and scope of the invention, as define by the appended claims.

What is claimed is:

1. An electrical armature comprised of a core having a plurality of pole teeth extending radially from a circular ring portion, a plurality of winding coils each encircling a respective one of said pole teeth, the coil windings on adjacent of said pole teeth being wound such that the radial extent of the windings relative to an axis of the respective pole tooth is not the same at all positions along the length of said pole tooth axis and the radially outermost winding of at least one of said adjacent pole teeth extends across an axially extending plane positioned equidistant between said adjacent pole teeth.

2. An electrical armature as set forth in claim 1 wherein the radial extent of the windings relative to an axis of the respective pole tooth tapers from one end of the pole tooth to the other.

3. An electrical armature as set forth in claim 2 wherein the tapers of the radial extent of the windings of adjacent pole teeth are in opposite directions.

4. An electrical armature as set forth in claim 1 further including an insulator covering at least one axial outer face of the pole teeth, the coil windings wound around said magnetic pole teeth having said insulator interposed therebetween, each of said insulators having at least one surface inclined relative to a radial plane perpendicular to the rotational axis of said rotating electric machine so that said magnetic pole teeth cores have a differing thickness in an axial direction along their length.

5. An electrical armature as set forth in claim 4 wherein the insulators of each of the adjacent pairs of pole teeth have a different configuration.

6. An electrical armature as set forth in claim 5 wherein the inclination of each insulator is such that the wire of the coil winding will be caused to slip axially of the pole teeth as it is wound without having to otherwise move the wire in an axial direction during winding.

7. An electrical armature as set forth in claim 6 wherein the insulator of one of the pair of adjacent pole teeth has a substantially greater taper at one of its ends than at its other end.

8. An electrical armature as set forth in claim 7 wherein taper of the insulator of the one of the pair of adjacent pole teeth has a taper only at the one of its ends.

9. An electrical armature as set forth in claim 7 wherein the greater taper at one of the ends of the insulator of one of the pair of adjacent pole teeth is also substantially greater than the taper of the insulator of the other pole tooth of the adjacent pair.

10. A method of winding an electrical armature comprised of a core having a plurality of pole teeth extending radially from a circular ring portion, winding an electric wire around a first of said pole teeth to form a plurality of winding coils the radial extent of which relative to an axis of the respective pole tooth is not the same at all positions along the length of the wound pole tooth axis so that the radially outermost winding extends across an axially extending plane positioned equidistant between adjacent pole teeth.

11. A method of winding an electrical armature as set forth in claim 10 further comprising the step of winding the pole tooth adjacent the already wound pole tooth to form a plurality of winding coils the radial extent of which relative to an axis of the respective pole tooth is not the same at all positions along the length of the wound pole tooth axis so that the radially outermost winding extends across an axially extending plane positioned equidistant between adjacent pole teeth and is spaced from the radially outermost winding of the first wound pole tooth in a direction along the radius of the armature.

12. A method of winding an electrical armature as set forth in claim 11 wherein the radially outermost winding of the first wound pole tooth is at one end thereof and the radially outermost winding of the second wound pole tooth is at the other end thereof.

13. A method of winding an electrical armature as set forth in claim 10 wherein a first of a plurality of adjacent pairs of pole teeth are wound and then the other of the of the plurality of adjacent pairs of pole teeth are wound.

14. A method of winding an electrical armature as set forth in claim 13 wherein the radially outermost winding of the first wound pole teeth is at one end thereof and the radially outermost winding of the second wound pole teeth is at the other end thereof.

\* \* \* \* \*